United States Patent [19]
Ogita

[11] Patent Number: 5,732,681
[45] Date of Patent: Mar. 31, 1998

[54] APPARATUS FOR DETECTING PROPERTIES OF FUEL IN INTERNAL COMBUSTION ENGINE AND METHOD OF THE SAME

[75] Inventor: Tamotsu Ogita, Susono, Japan

[73] Assignee: Toyota Jidosha Kabushiki Kaisha, Toyota, Japan

[21] Appl. No.: 820,137

[22] Filed: Mar. 19, 1997

[30] Foreign Application Priority Data

Apr. 2, 1996 [JP] Japan ................... 8-106362

[51] Int. Cl.$^6$ ............................................. F02M 51/00
[52] U.S. Cl. ............................................. 123/492
[58] Field of Search .......................... 123/492, 491; 364/431, 51; 477/111

[56] References Cited

U.S. PATENT DOCUMENTS

| | | | |
|---|---|---|---|
| 5,564,393 | 10/1996 | Asano et al. | 123/492 |
| 5,597,371 | 1/1997 | Toukura | 477/111 |
| 5,609,139 | 3/1997 | Ueda et al. | 123/492 |
| 5,629,853 | 5/1997 | Ogawa et al. | 364/431.51 |
| 5,647,324 | 7/1997 | Nakajima | 123/491 |

FOREIGN PATENT DOCUMENTS

| | | | |
|---|---|---|---|
| 2-301636 | 12/1990 | Japan | 123/492 |
| 3-111642 | 5/1991 | Japan | 123/492 |

*Primary Examiner*—Raymond A. Nelli
*Attorney, Agent, or Firm*—Kenyon & Kenyon

[57] ABSTRACT

The internal combustion engine fuel property detecting apparatus of the present invention can realize the fuel property detection which is free from the influence of the wall surface fuel deposit amount before the transient time and to prevent the erroneous determination. If fuel cut-off is carried out on fulfillment of the fuel cut-off conditions (S220), it is judged whether or not transition to the acceleration state has occurred within the prescribed time t0 after completion of the fuel cut-off (S260). On determination of transition to the acceleration state, the transition amount ΔAF in the detected values of the air-fuel ratio sensor 85 (S270–S300) and the fuel supplied is determined as whether or not a heavy fuel (S310–S320). When the fuel supply is cut off, the fuel having adhered to the wall surface of the intake manifold and the cylinder is ingested into the combustion chamber with the negative pressure of the internal combustion engine and the wall surface deposit amount is evenly reduced; the fuel property determination is made after acceleration starts in the state wherein the wall surface deposit amount is evenly reduced and thus erroneous determination is effectively prevented.

20 Claims, 10 Drawing Sheets

APPARATUS FOR DETECTING PROPERTIES OF FUEL IN INTERNAL COMBUSTION ENGINE AND METHOD OF THE SAME

BACKGROUND OF THE INVENTION

1. Field of the Invention

The present invention relates to an apparatus for detecting the properties of the fuel supplied to an internal combustion engine, and also to a method of the same.

2. Description of the Prior Art

Properties of the fuel for motor vehicles, including volatility, anti-knock performance and stability, closely relate to the drivability and output performance. As a fuel property detecting apparatus for detecting these properties, a technique was proposed in JAPANESE PATENT LAID-OPEN GAZETTE No. 3-111642. This technique determines the fuel properties based on the analysis of the change in the output of the air-fuel ratio sensor at a transient time such as acceleration or deceleration. When fuel is jet out of an injector, some of the fuel adheres to the wall surfaces of an intake manifold and a cylinder and the amount of fuel adhering to the wall surface varies a lot according to the fuel properties. The constitution proposed above, which performs wall surface deposit amount detection based on the air-fuel ratio sensor output at the transient time, enables the determination of the fuel properties in the state wherein the amount of fuel adhering to the wall surface varies a lot and thus the detecting accuracy has been improved.

In the prior art discussed above, however, errors have occurred in the fuel property determination in case that a large amount of fuel has adhered to the wall surface of the intake manifold or the cylinder before the transient time such as acceleration, since most of the fuel injected at the transient time would contribute to combustion without adhering to the wall surface even in case of a heavy fuel of low volatility. That is, the variety in the amount of fuel adhering to the wall surface at the stage before the transient time would result with variety in the air-fuel ratio sensor output at the transient time even with the same gasoline, and thus errors in fuel property determination have been caused.

SUMMARY OF THE INVENTION

The object of the present invention is thus to realize the fuel property detection which is free from the influence of the wall surface fuel deposit amount before the transient time and to prevent the erroneous determination.

At least part of the above object is realized by an apparatus for detecting properties of the fuel supplied to an internal combustion engine. The apparatus comprises: fuel supply control means for controlling the fuel supply to the internal combustion engine; determination means for determining whether or not the internal combustion engine being operated is in a prescribed state which includes re-start of the fuel supply after the fuel supply has been stopped by the control according to the fuel supply control means; combustion state transition detection means for detecting transition in combustion state in the internal combustion engine when the internal combustion engine being operated is determined to have reached the prescribed state by the determination means; and fuel property determination means for determining properties of fuel supplied to the internal combustion engine based on the detected transition in the combustion state.

In this structure, if the fuel supply is stopped under the control by the fuel supply control means and then the internal combustion engine being operated recovers the prescribed state including the re-start of the fuel supply, the transition in the combustion state in the internal combustion engine is detected by the combustion state transition detection means. When fuel supply is stopped, the fuel having adhered to the wall surface of the intake manifold and cylinder burns to reduce the amount of fuel adhering to the wall surface evenly while the operation is stopped; and then a transient state from an insufficient fuel state to a sufficient fuel state with the fuel supply means is produced when the fuel supply is re-started. The transition in the combustion state caused by increased fuel in the transient state is detected by the combustion state transition detection means. The properties of the fuel supplied to the internal combustion means are determined by the fuel property determination means based on the detected transition in the combustion state.

Accordingly, since the wall surface fuel deposit amount is reduced by the stop of the fuel supply even if the amount of fuel adhering to the wall surface is large before entering the transient state, the fuel property detection result will not be influenced by the amount of fuel adhering to the wall surface before entering the transient state. This makes the properties of the fuel supplied at the transient time reflects definitely on the combustion state transition, thereby preventing errors in the determination of the fuel properties and thus increasing the accuracy of the detection.

In accordance with one preferable application, the fuel supply control means may comprise fuel supply increase means for increasing the amount of the fuel beyond the prescribed amount, and the determination means comprises means for determining whether or not the fuel supply amount has been increased by the fuel supply amount increase means, thereby determining whether the internal combustion engine being operated has reached the prescribed state.

In this structure, a transient state from a no-fuel state caused by the stop of the fuel supply to an increased fuel supply state can be created and thus a large increment of the fuel supply amount at the transient state is available. This makes the fuel property detection easier.

In accordance with one preferable application, the combustion state transition detection means may be an air-fuel ratio sensor for detecting air-fuel ratio of emission from the internal combustion engine, the air-fuel ratio sensor detects the transition in the combustion state.

In accordance with one preferable application, the combustion state transition detection means may be a revolution speed sensor for detecting a revolution speed of the internal combustion engine, the revolution speed sensor detects the transition in the combustion state.

In accordance with one preferable application, the internal combustion engine fuel property detection apparatus may further comprise: start time detection means for detecting a starting time of the internal combustion engine; after-start detection means for detecting combustion state transition in the internal combustion engine at a transient time immediately after detection of starting time of the internal combustion engine by the start time detection means; whereby the fuel property determination means determines properties of the fuel which is supplied to the internal combustion engine, based on the combustion state transition which has been detected by the after-start detection means, as well as the combustion state transition which has been detected by the combustion state transition detection means.

In this structure, the fuel property determination is carried out after the combustion state is determined twice, first at the transient time immediately after the start of the internal combustion engine operation and then at the time when the fuel supply is stopped, thereby further preventing errors in the determination.

In accordance with one preferable application, the apparatus may further comprise control means for forcing the fuel supply by the fuel supply means to stop, irrelevant to the operation state of the internal combustion engine, at the time of fuel property detection.

In this structure, the fuel property determination needs not to wait for stop of fuel supply which is carried out as the operation state demands. This makes it easier to carry out the fuel property detection more frequently, thereby increasing the accuracy of the detection.

In accordance with an alternative preferable application, the internal combustion engine is mounted on a vehicle and it is desirable that the apparatus further comprises: a motor for generating a turning force sufficient to drive an axles of the vehicle with supplied electric power; and drive adjustment means for driving the axles of the vehicle only with the turning force of the motor during a period which the fuel supply is stopped by the control means.

In this structure, the vehicle travels with the drive of the axles by the motor alone at the time of the fuel property detection and thus people on the vehicle will not physically feel any fluctuation in the internal combustion engine load caused by the fuel cut-off as fluctuation in torque for drive. Accordingly, the fuel properties are detected without incurring the drivability of the vehicle being driven.

In accordance with still another alternative preferable application, the apparatus may further comprise control means for forcing the fuel supply under control of the fuel supply control means to stop, irrelevant to the operation state of the internal combustion engine at the time of fuel property detection and then forcing increase in fuel supply amount under the control of the fuel supply amount of said fuel supply increase means to be carried out, irrelevant to operation state of the internal combustion engine.

In this structure, the fuel property detection needs not to wait for fuel cut-off and the fuel supply amount increase control (acceleration control). This makes it easier to increase the frequency of the fuel property detection, thereby increasing the accuracy of the detection.

In accordance with still another alternative preferable application, the internal combustion engine is mounted on a vehicle and it is desirable that the apparatus further comprises: a motor for generating a turning force sufficient to drive an axles of the vehicle with supplied electric power; and drive adjustment means for driving the axles of the vehicle only with the turning force of the motor during a period which the fuel supply is stopped and the fuel supply amount is increased by the control means.

In this structure, the vehicle travels with the drive of the axles by the motor alone at the time of the fuel property detection and thus people on the vehicle will not physically feel any fluctuation in the internal combustion engine load caused by the stop or increase of fuel supply as fluctuation in torque for drive. Accordingly, the fuel properties are detected without incurring the drivability of the vehicle being driven.

In accordance with one preferable application, a property of the fuel used for the internal combustion engine fuel property detection apparatus may be volatility.

The present invention is also directed to a method of detecting the fuel properties, which comprises the steps of:

(a) controlling of fuel supply to the internal combustion engine;

(b) determining whether or not the internal combustion engine being operated is in a prescribed state which includes the re-start of the fuel supply after the stop of the fuel supply in the step (a);

(c) detecting transition in the combustion state of the internal combustion engine in case that the internal combustion engine has been determined to be in the prescribed state in the step (b); and (d) determining the properties of the fuel supplied to the internal combustion engine, based on the detected transition in the combustion state.

In this structure, in the same way as the apparatus discussed above, even if the amount of fuel adhering to the wall surface is large before the transient time, the fuel property detection result cannot be influenced by the wall surface deposit amount before the transient time, since the wall surface deposit amount becomes small due to the stop of fuel supply. Therefore, the properties of the fuel supplied at the transient time can be reflected more definitely on the combustion state transition. Consequently, errors in the fuel property determination are prevented to increase the detection accuracy.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
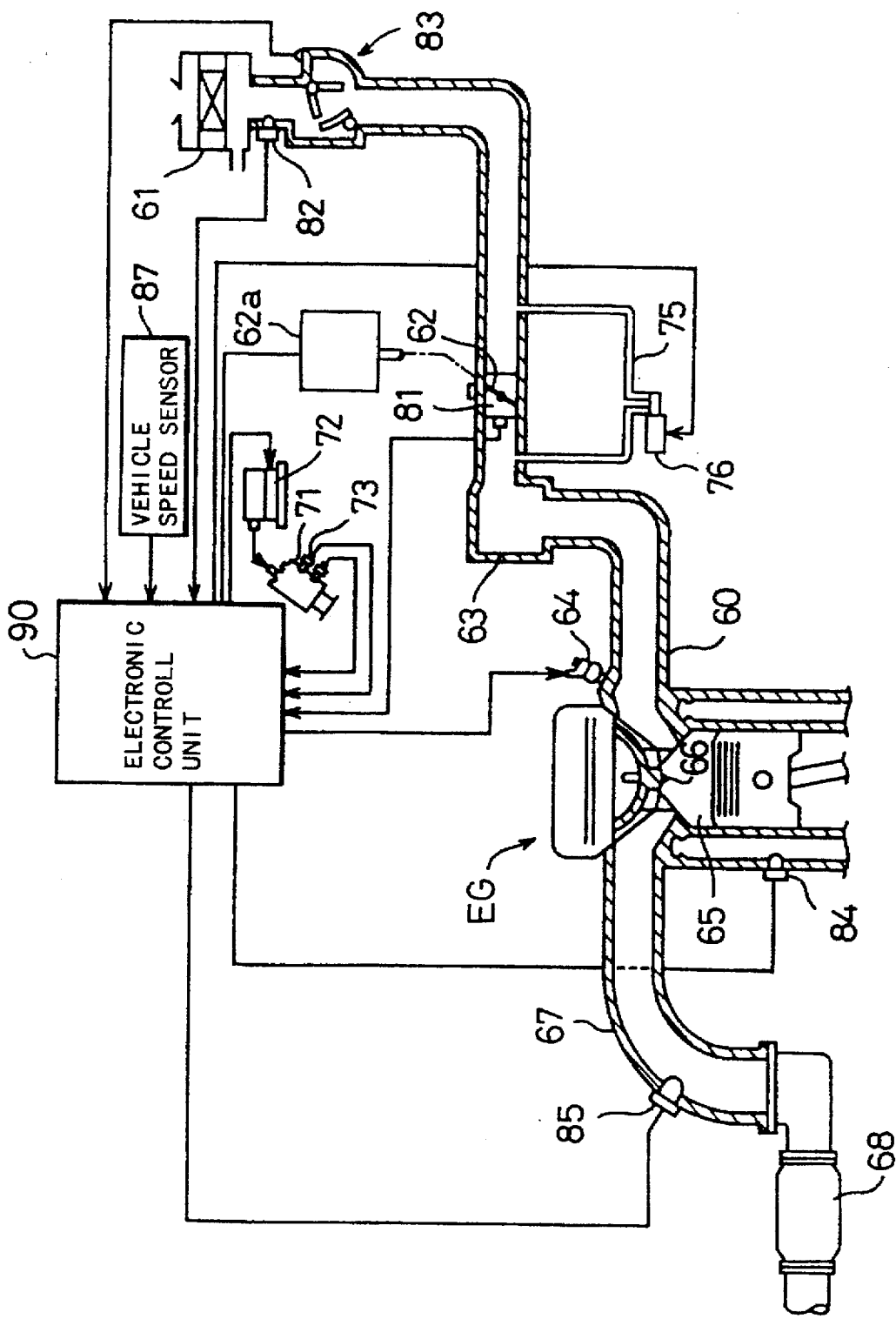
FIG. 1 shows structure of an internal combustion engine and the peripheral elements for a vehicle with an internal combustion engine fuel property detection apparatus of a first embodiment according to the present invention mounted thereon.

Modes of carrying out the present invention are described below as preferable embodiments. FIG. 1 shows structure of an internal combustion engine EG and the peripheral elements for a vehicle with an internal combustion engine fuel property detection apparatus of a first embodiment according to the present invention mounted thereon. Referring to FIG. 1, topped by an air intake port, an intake manifold 60 of the internal combustion engine EG is equipped with an air cleaner 61, a throttle valve 62 that is driven to open and close by a throttle actuator 62a, a surge tank 63 that subdues pulsation of the intake air and an injector 64 that supplies fuel to the internal combustion engine EG.

Atmospheric air is ingested via the intake manifold 60, mixed with fuel injected from an injector 64 and then ingested into a combustion chamber 65 of the internal combustion engine EG. The fuel-mixed air, ignited with sparks of an ignition plug 66 in the combustion chamber 65, drives the internal combustion engine EG. After combustion in the combustion chamber 65, exhaust gas is lead to a catalytic convertor 68 via an exhaust manifold 67 and then exhausted into the atmospheric air after purification.

A high voltage power from an igniter 72 via a distributor 71 is applied on the ignition plug 66, and this voltage power application timing decides the ignition timing. The distributor 71 for distribution of a high voltage power to each plug 66 of the cylinders has a revolution speed sensor 73 for output of twenty-four pulse signals per revolution.

A bypass passage 75 is formed on the intake manifold 60 of the internal combustion engine EG so as to bypasses the throttle valve 62 and the bypass passage 75 is attached with an ISCV (idle speed control valve) 76. The ISCV 76 has a valve disc having an excellent high-speed response and its valve travel controlled by a linear solenoid, and outputs a duty signal, which has a duty ratio corresponding to a ratio of closing time to opening time of the valve disc, to the linear solenoid, so as to control the air flow with a high accuracy. Adoption of the ISCV 76 enables the high speed control of the intake air amount at the idling time of the internal combustion engine without use of a throttle actuator 62 which usually includes a large DC motor.

The internal combustion engine is equipped with sensors for detecting the operation state, such as a revolution speed sensor 73, a throttle position sensor 81 which is incorporated with an idle switch 80 (FIG. 2) for detecting the opening extent and fully closed state of the throttle valve 62, an intake air temperature sensor 82 which is disposed in the intake manifold 60 for detecting the intake air temperature, an air flow meter 83 for detection of the intake air amount, a water temperature sensor 84 which is disposed in the cylinder block for detecting the cooling water temperature, an air-fuel ratio sensor which is disposed in the exhaust manifold 67 for detecting the air-fuel ratio of the exhaust and a vehicle speed sensor 87 for detecting the vehicle speed, and the detection results are transmitted to the electronic control unit 90.

Figure 2:
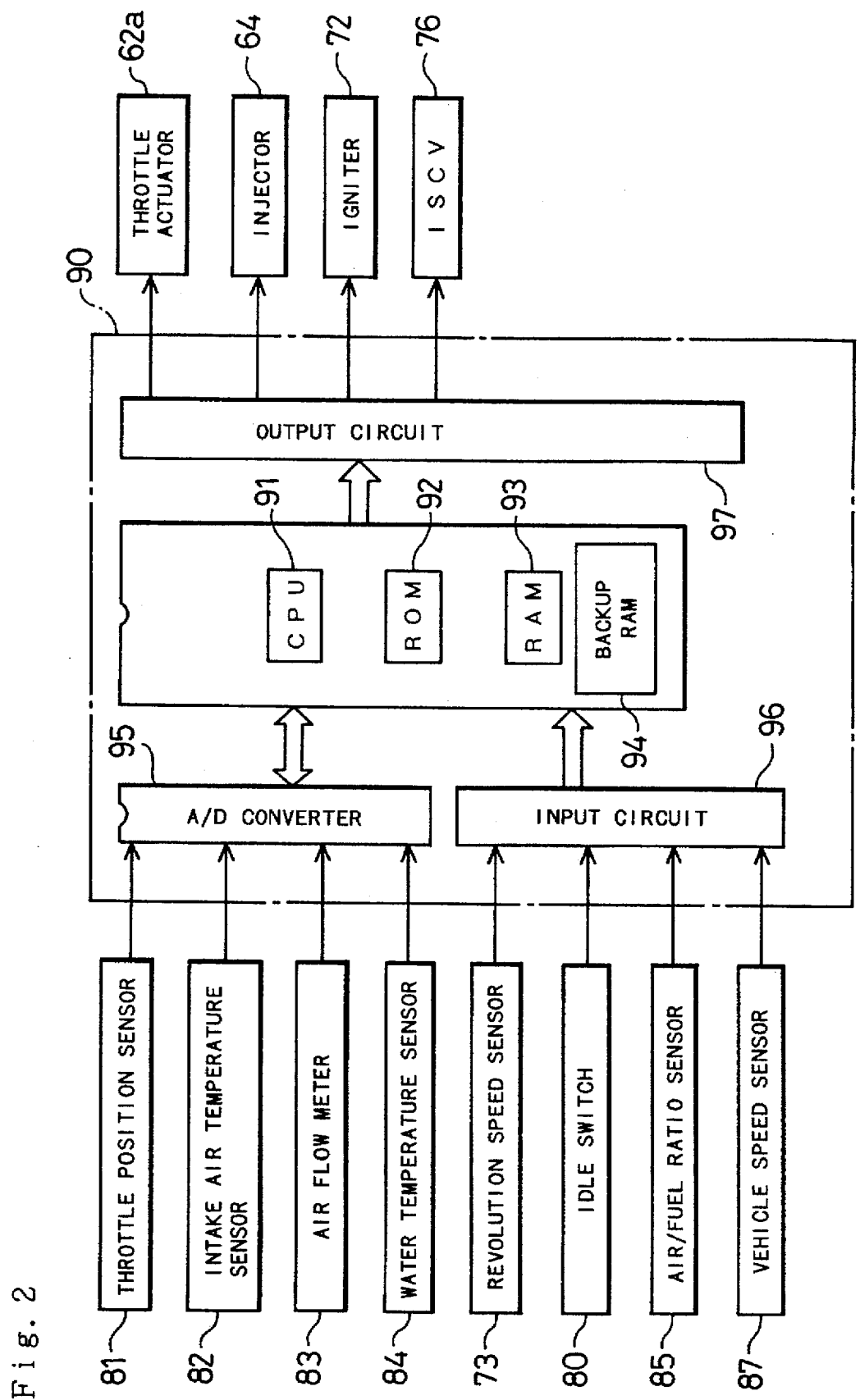
FIG. 2 is a block diagram illustrating a control system including the electronic control unit.

FIG. 2 is a block diagram illustrating a control system including an electronic control unit (hereinafter referred to as ECU) 90. The ECU 90 is constructed as a logical operation circuit including a micro computer as shown in FIG. 2. The ECU includes a CPU 91 for executing a variety of operations according to present control programs for the internal combustion engine EG, a ROM 92 which stores in advance control programs and control data required for the various operations executed by the CPU 91, a RAM 93 which a variety of data required for the various operations executed by the CPU 91 are temporarily written into and read from, a backup RAM 94 for maintaining data during power-off time, an A/D converter 95 and an input circuit 96 for receiving the vehicle information and an output circuit 97 for sending the drive signals based on the results of operation by the CPU 91 to the throttle actuator 62a, the injector 64, the igniter 72 and the ISCV 76.

In this embodiment, the ECU 90 of this structure controls the injector 64, the igniter 72, the ISCV 76 and other elements so as to be driven by optimal amounts at the optimal timings; that is, the internal combustion engine EG is driven namely by the fuel injection control, the ignition timing control and the idling revolution speed control. The fuel injection control herein includes the air-fuel ratio feedback correction that is to control the air-fuel ratio of the fuel mixed air at a theoretical air-fuel ratio, correcting by increase or decrease in the fuel injection amount according to the detected results of the air-fuel ratio sensor 85, which is the same as the conventional fuel injection control and thus a detailed description is eliminated here.

In this embodiment, the ECU 90 carries out the fuel properties detection as well at the start of the internal combustion engine. The processing at the start of the internal combustion engine, or the internal combustion engine starting routine is described in detail below.

Figure 3:
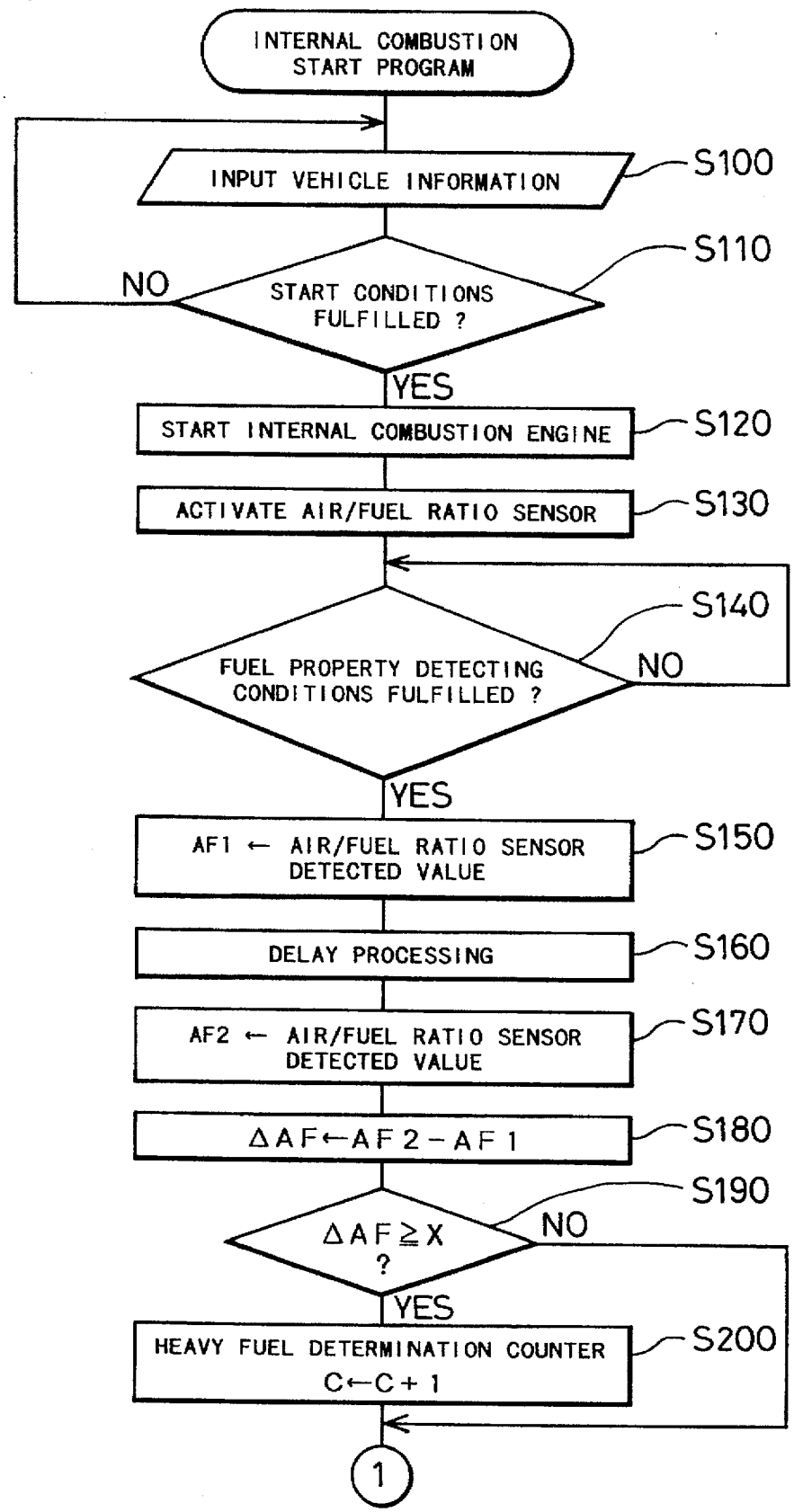
FIG. 3 and FIG. 4 are flowcharts showing an internal combustion engine starting routine executed by the CPU in the electronic control unit.
Figure 4:
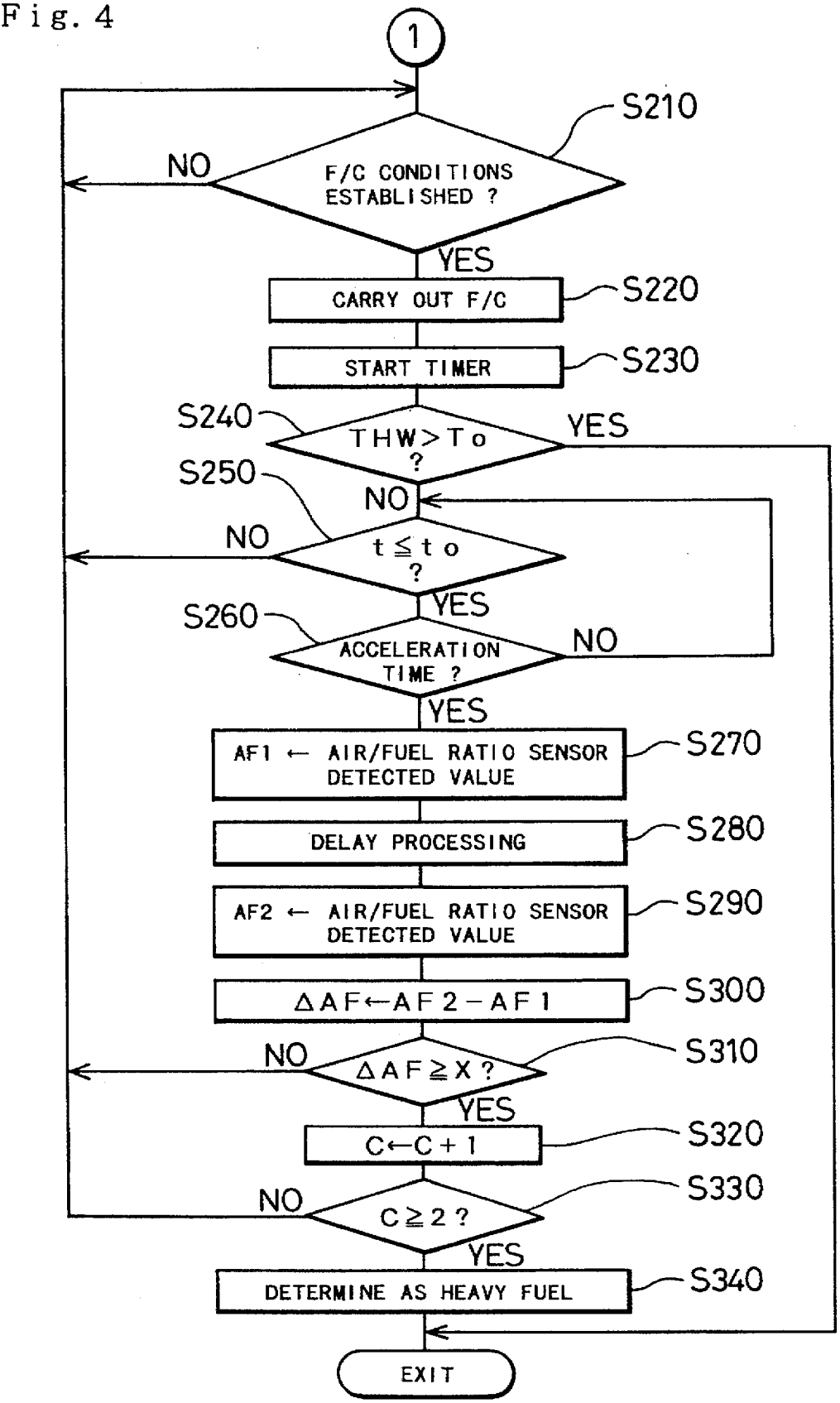

FIG. 3 and FIG. 4 are flowcharts showing an internal combustion engine starting routine executed by the CPU 91 in the ECU 90. This routine is executed after the ignition key is switched to the start position. As shown in the flowcharts, when the CPU 91 starts the routine, the present vehicle information is received at step S100 to be informed of the vehicle operation state. Based on the information, it is judged whether or not the conditions to start the operation of the internal combustion engine EG have been fulfilled at step S110, where the conditions include whether or not the value of a revolution speed NE of the internal combustion engine EG is zero and whether or not the idle switch 80 is in ON position. If all of these conditions are not fulfilled, the program returns to the step S100 and repeats the processing of the steps S100 and S110.

If it is judged that the internal combustion engine is requested to start the operation with all the conditions fulfilled, the operation of the internal combustion engine is started at step S120. A heater for the air-fuel ratio sensor 85 is turned on to activate the air-fuel ratio sensor 85 at step S130.

It is judged next whether or not the conditions to detect the fuel properties are fulfilled at step S140, where the conditions include whether or not the vehicle is in the acceleration state. If these conditions are not fulfilled, the processing at step S140 will be repeated till the conditions are fulfilled.

If it is judged that the conditions to detect the fuel properties are fulfilled at step S140, the program proceeds to step S150 and a variable AF1 is set to a detected value of the air-fuel ratio sensor 85. Then, after a delay processing of the prescribed duration is carried out at step S160, a variable AF2 is set to another detected value of the air-fuel ratio sensor 85 at step S170. Next, the variable AF1 set at step S150 is subtracted from the variable AF2 set at step S170 to obtain an air-fuel ratio transition amount $\Delta AF$ at step S180.

When the vehicle is in the acceleration state, the fuel supply is increased by the fuel injection control by another routine. At above-described steps S140 through S180, the timing of the fuel supply increase is detected and the air-fuel ratio transition amount $\Delta AF$ after the fuel supply increase for the prescribed duration mentioned above is detected.

It is judged next whether the air-fuel ratio transition amount $\Delta AF$ is not smaller than a prescribed value X at step S190. If it is judged that the air-fuel ratio transition amount $\Delta AF$ is not smaller than the prescribed value X here, after increment of a counter C for determination that the fuel supplied to the internal combustion engine EG is a heavy fuel by value 1 at step S200, the program proceeds to step S210 in FIG. 4.

The fact that the air-fuel ratio transition amount ΔAF is not smaller than the prescribed value X indicates that the air-fuel ratio has shifted largely to the lean side. The shift of the air-fuel ratio to the lean side in spite that the fuel supply increase at the acceleration time has been decided at step S140 leads to an estimation that the amount of the fuel contributing to combustion is small even at the acceleration time when intake amount increases, that is, an estimation that the amount of fuel adhering to the wall surface has increased. Therefore, the increment of the counter C by value 1 is carried out, based on the determination that, if the air-fuel ratio transition amount ΔAF is the larger, there is a higher possibility of use of a fuel of the larger wall surface deposit amount, or a fuel of the lower volatility.

On the other hand, if it is judged that the transition amount ΔAF is smaller than the prescribed value X at step S190, the program skips step S200 and proceeds to step S210. It is assumed that the value at the counter C has been cleared to an initialized value zero at the start time of this routine.

The CPU 91 judges whether or not the conditions to carry out a fuel cut-off (abbreviated as F/C in the flowchart) are fulfilled. The fuel cut-off conditions here include the state wherein the revolution speed of the internal combustion engine EG is high while the throttle valve is fully closed, that is, an engine brake state. If these conditions are not fulfilled, the processing at step S210 will be repeated till the conditions are fulfilled.

If it is judged at step S210 that the conditions to detect fuel properties are fulfilled, the program proceeds to step S220 and the fuel cut-off is carried out. In the fuel cut-off routine, an injection stop signal is sent to the injector 64 to stop the fuel supply. Then a timer not shown in the drawing is started to operate at step 230. It is judged next whether or not the cooling water temperature THW detected by the water temperature sensor 84 is higher than a prescribed temperature T0 at step 240. If it is judged here that the cooling water temperature THW is higher than a prescribed temperature T0, the program exits from this routine since the fuel adhering to the intake manifold and cylinder is obscured and thus fuel property detection is disabled.

If it is judged here that the cooling water temperature THW is not higher than a prescribed temperature T0 at step S240, the program carries out the following processing. First, it is judged whether or not the time t indicated by the timer started at step 230 is within a prescribed time t0 at step 250 and then it is judged whether or not transition to the acceleration time when the internal combustion engine EG is in the acceleration state has occurred within the prescribed time t0 at step S260. The determination of the acceleration state is based on such fact as an increase in the detected value of the throttle position sensor 81.

If transition to the acceleration time has not occurred within the prescribed time t0, the program returns to step S210 and waits for another fuel cut-off. If an affirmative judgment is made, that is, transition to the acceleration time has occurred, the program proceeds to step S270.

Processing at steps S270 through S320 is the same as the processing at steps S150 through S200, whereat the air-fuel ratio transition amount ΔAF during the prescribed time immediately after the acceleration is obtained and increment of the counter C by value 1 is carried out only when the transition amount ΔAF is such a large one as not smaller than the prescribed value X. If a negative determination is made at step S310, the program returns to step S210 and wait for another fuel cut-off.

After execution of step S330, it is judged whether or not the value at the counter C has been increased to 2 and, if the value at the counter C is judged to be larger than 2, the fuel supplied to the internal combustion engine EG is determined as a heavy fuel for the first time at step S340. When the fuel property determination is thus completed, the program exits from this routine.

If it is judged that the value at the counter C has not been increased to 2, the fuel cannot be determined as of a heavy and thus the program returns to step S210 to wait for another fuel cut-off and the fuel property detection processing is continued.

According to the internal combustion engine start processing of the structure discussed above, if the conditions to detect fuel properties, such as at the transient time, are fulfilled immediately after the internal combustion engine is started, the first determination on heavy fuel is made, based on the transition amount ΔAF of the detected values of the air-fuel ratio sensor 85, and then it is judged whether or not the acceleration state is obtained in the prescribed time t0 after the fuel cut-off is carried out; when the acceleration state is obtained, the second determination on heavy fuel is made, based on the transition amount of the detected values of the air-fuel ratio sensor 85. After the determination on the use of a heavy fuel is made twice, it is finally judged that a heavy fuel is used. Even if the result of the determination on heavy fuel before the fuel cut-off is negative, the positive determination on the heavy fuel is made when two positive results of determination on the heavy fuel are given after the fuel cut-off.

As discussed above in detail, in the first embodiment, the fuel property is detected from the detected value transition amount ΔAF of the air-fuel ratio sensor 85 in the state of acceleration within the prescribed time t0 if fuel cut-off is carried out after fulfillment of the fuel cut-off conditions. If fuel supply is stopped by the fuel cut-off, the fuel having adhered to the wall surface of the intake manifold 60 and the cylinder is ingested into the combustion chamber and, thus the wall surface fuel deposit amount being evenly reduced, the fuel property determination is made when acceleration starts in the state wherein the wall surface fuel deposit amount is evenly small. Particularly after the fuel cut-off, the throttle valve 62 is fully closed and, with the negative pressure of the internal combustion engine EG being increased at that time, the fuel having adhered to the wall surface of the intake manifold 60 and the cylinder is ingested into the combustion chamber; thus the wall surface deposit amount is almost none and the fuel property determination is made after acceleration starts in the state wherein the wall surface deposit amount is almost none.

Therefore, the fuel property detection result is not influenced by the wall surface deposit amount before the acceleration time, and the properties of the fuel injected at the time of acceleration are definitely reflected on the transition of the combustion state. As the result, erroneous determination of the fuel properties is prevented, increasing the detection accuracy thereby.

Since the combustion state is determined twice in the first embodiment, first at the transient time immediately after the operation of the internal combustion engine EG is started and second at the later fuel cut-off time before the final judgement on the fuel property, the erroneous determination is more successfully prevented.

A second embodiment according to the present invention is described below. In the first embodiment, the determination on the heavy fuel is made at the steps S150 through S200 or at steps S270 through S320 of the internal combustion chamber start processing which is carried out in the ECU 90 but, in the structure of the second embodiment, the heavy fuel is determined in the processing shown in the flowchart in FIG. 5.

Figure 5:
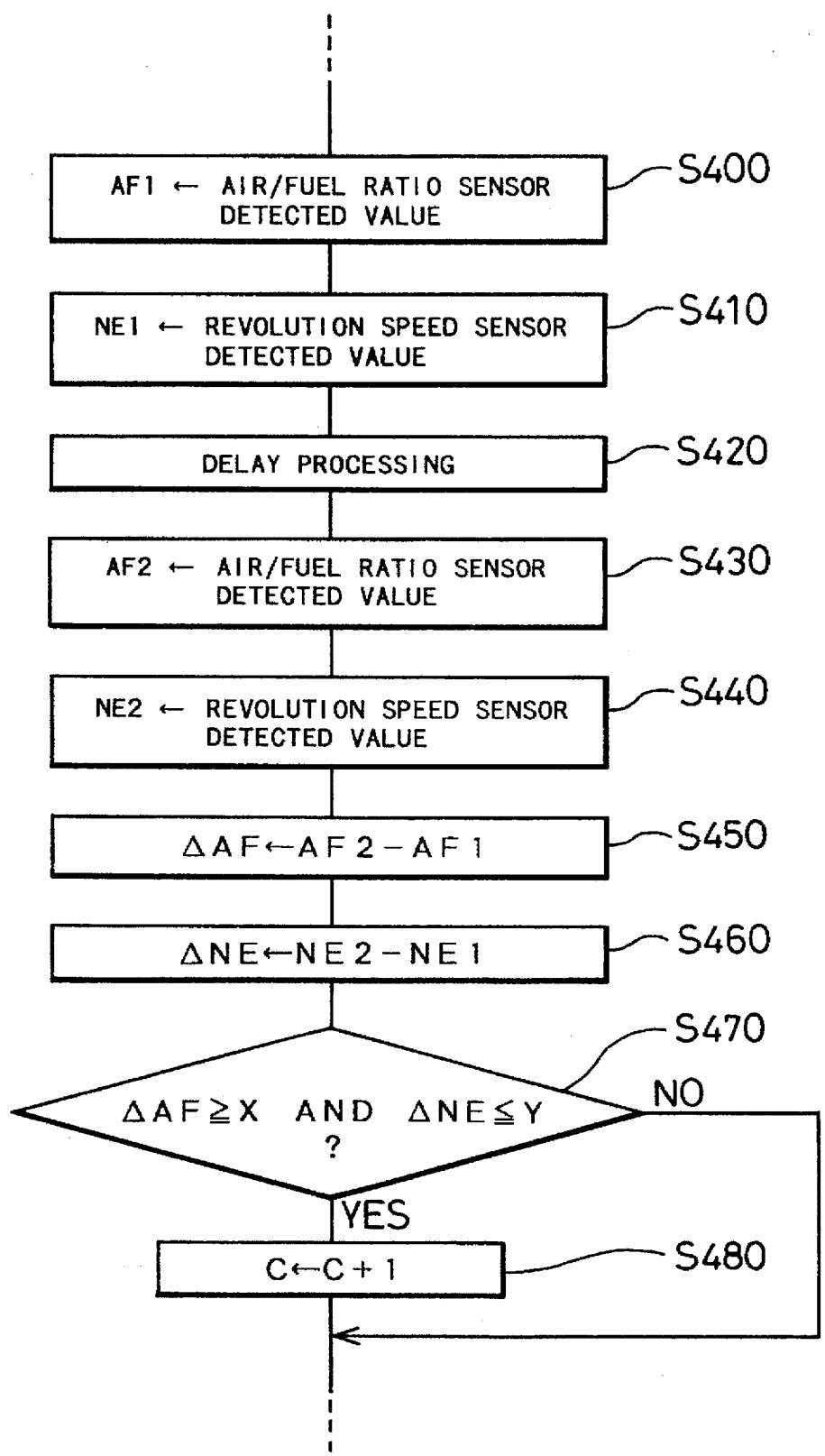
FIG. 5 is a flowchart showing the latter part of the internal combustion engine starting routine executed by the CPU in the electronic control unit of a second embodiment.

As shown in FIG. 5, the variable AF1 is set to a detected value of the air-fuel ratio sensor 85 at step S400 and a variable NE1 is set to a detected value of the revolution speed sensor 73 at step S410. After the delay processing for the prescribed time is carried out at step S420, the variable AF2 is set to another detected value of the air-fuel ratio sensor 85 at step S430 and the variable NE2 is set to another detected value of the revolution speed sensor 73 at step S440. The variable AF1 set at step S400 is subtracted from the variable AF2 set at step S430 to obtain the air-fuel ratio transition amount $\Delta AF$ at step S450 and the variable NE1 set at step S410 is subtracted from the variable NE2 set at step S440 to obtain the revolution speed transition amount $\Delta NE$ at step S460.

It is judged now whether the air-fuel ratio transition amount $\Delta AF$ is not smaller than a prescribed value X while whether the revolution speed transition amount $\Delta NE$ is not larger than a prescribed value Y at step S470. If it is judged that the air-fuel ratio transition amount $\Delta AF$ is not smaller than the prescribed value X while the revolution speed transition amount $\Delta NE$ is not larger than the prescribed value Y, increment of a counter C by value 1 C for determination that the fuel supplied to the internal combustion engine EG is a heavy fuel is carried out at step S480. If a negative determination is made at step S470, the program skips step S480 and proceeds t the next step. In case that the processing shown in FIG. 5 is a substitute to the steps S270 through S320 to be carried out after the fuel cut-off, the program returns to step S210 whereat it is determined whether or not the fuel cut-off conditions are fulfilled, in the same way as in FIG. 4, if a negative determination is made at step S470.

The fact that the revolution speed transition amount $\Delta NE$ is not larger than the prescribed value Y leads to an estimation that the amount of the fuel contributing to combustion is small in spite that the fuel supply has been increased at the acceleration time, that is, an estimation that the amount of fuel adhering to the wall surface has increased. Therefore, it can be determined that, if the revolution speed transition amount $\Delta NE$ is the smaller, there is a higher possibility of use of a fuel of the larger wall surface deposit amount, or a fuel of the lower volatility.

Therefore the second embodiment with addition of the determination subject to the revolution speed NE of the internal combustion engine EG as well as the determination of the fuel property subject to the air-fuel ratio transition amount $\Delta AF$ indicated in the first embodiment has a higher accuracy of fuel property detection.

An alternative structure to substitute the structure of the second embodiment, wherein the fuel properties are detected only in the transition of the revolution speed NE of the internal combustion engine EG, can have the effect similar to that of the first embodiment.

Another alternative structure, which substitutes the structure of the first and second embodiments wherein the fuel properties are determined according to the detected values of the air-fuel ratio sensor 85 if it is judged to be in the acceleration state within the prescribed time after the fuel cut-off is carried out, may determine the fuel properties according to the detected values of the air-fuel ratio sensor 85 after the fuel cut-off is carried out. In detail, the processing at step S260 in FIG. 4 may be substituted with a processing of determination on the start of the fuel supply from the fuel injection valve, that is, whether or not the fuel supply has been started after completion of the fuel cut-off; if it is determined that the fuel supply has not been started at this step, the program returns to step S250 while the program proceeds to step S270 (step S400 in the case of the second embodiment) if it is determined that the fuel supply has been started.

In this structure, when the fuel cut-off is carried out, the fuel having adhered to the wall surface of the intake manifold 60 and the cylinder is burnt to evenly reduce the wall surface deposit amount and, under this circumstance, a transient state from the no-fuel state caused by the fuel cut-off to the fuel-existing state caused by the start of the fuel supply is created, wherein the fuel properties are determined through utilization of the fuel amount increase in the transient state. Therefore, this structure also allows the properties of the supplied fuel to be reflected definitely on the transition in the combustion state since the result of the fuel property detection is not influenced by the wall surface deposit amount before the fuel property detection.

In the aspect of accuracy in the fuel property detection, the first and second embodiments which have a structure wherein the fuel properties are programmed so as to be detected in the acceleration state are superior to the alternative structure discussed above since the difference from the fuel cut-off time in the fuel supply amount is larger than the structure discussed above.

Figure 6:
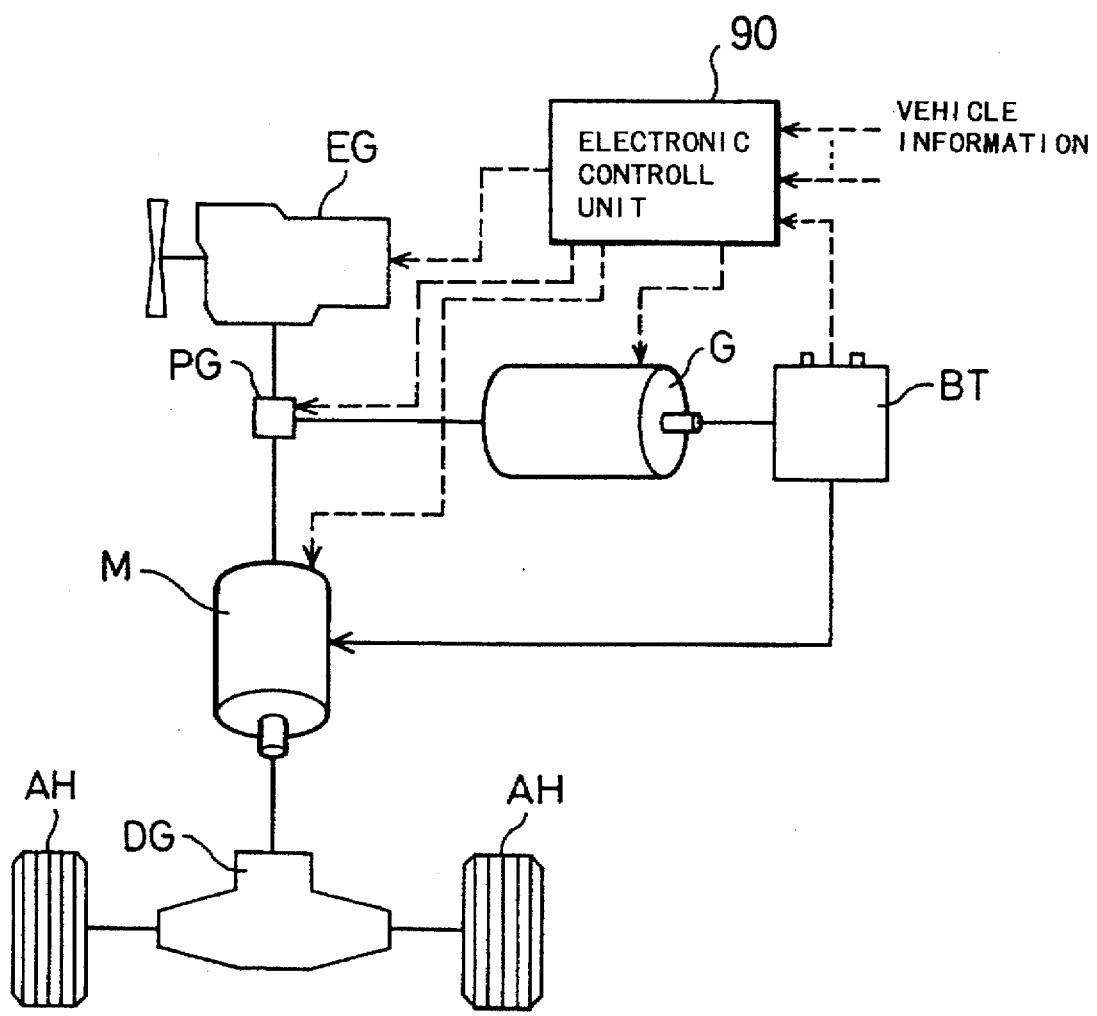
FIG. 6 shows structure of a hybrid vehicle with an internal combustion engine fuel property detection apparatus of a second embodiment according to the present invention mounted thereon.

A third embodiment according to the present invention is described below. The structure of the third embodiment is an application to a hybrid vehicle which includes an internal combustion engine and a motor as its power sources. FIG. 6 shows structure of the hybrid vehicle.

As FIG. 6 shows, the hybrid includes an internal combustion engine EG, an output shaft of which is connected to a planetary gear unit PG. The planetary gear unit PG is linked with a generator G and a motor M, so that the rotational motion of the output shaft of the internal combustion engine EG is distributed and transmitted to either one or both of the generator G and the motor M via the planetary gear unit PG. The output shaft of the motor M is connected to a differential gear DG, which is further linked with driving wheels AH of the vehicle via axles AX.

Figure 7:
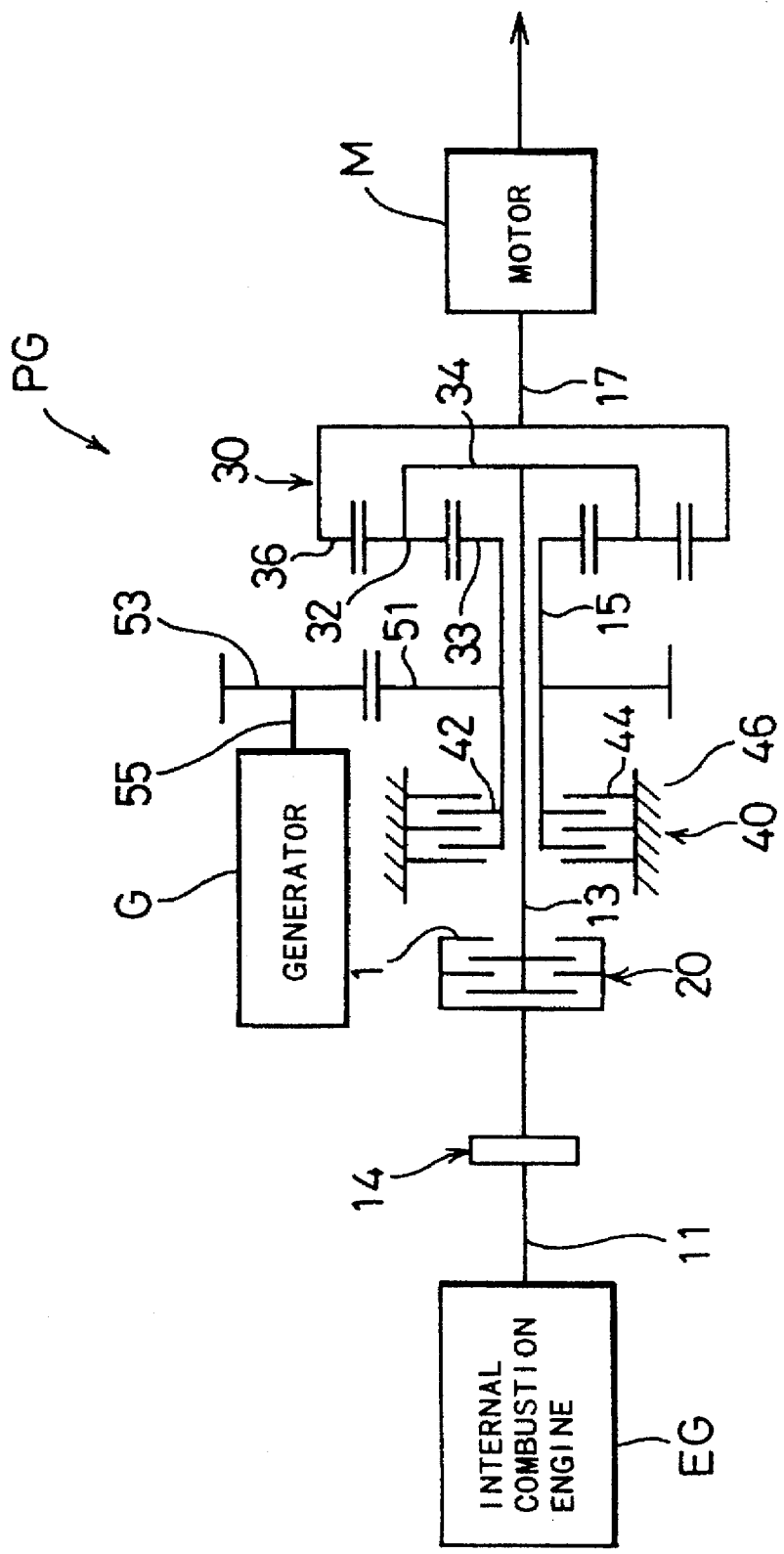
FIG. 7 schematically illustrates a planetary gear unit adopted for the hybrid vehicle.

A schematic drawing in FIG. 7 shows a detailed structure of the planetary gear unit PG. As FIG. 7 shows, an output shaft 11 linked with a crankshaft of the internal combustion engine EG is further linked with an intermediate shaft 13 via a first clutch 20. The output shaft 11 is provided with a hydraulic pressure supply source 14, such as a gear pump. The hydraulic pressure supply source 14 consumes part of the power output from the internal combustion engine EG and generates a hydraulic oil pressure to function as a power source for connecting the first clutch 20. In accordance with an alternative structure, a hydraulic oil pressure may be generated not by the power of the internal combustion engine EG but with a small-sized separate motor. This alternative structure can operate the first clutch 20 while the internal combustion engine EG is at a stop.

The intermediate shaft 13 is integrally joined with a carrier 34 which supports a planetary gear 32 included in a planetary gear mechanism 30 to allow rotational motions of the planetary gear 32. A sun gear 33 engaging with the planetary gear 32 is attached integrally to a rear end of a hollow rotating shaft 15. A front end of the hollow rotating shaft 15 is connected to a rotatable frictional plate 42 of a second clutch 40 that constitutes a multi-plate-type gearshift brake. A stationary friction plate 44 is fixed to a casing 46. A gear 51 is further linked with the hollow rotating shaft 15 via splines. A rotating shaft 55 of a gear 53 engaging with the gear 51 works as a shaft of the generator G. A ring gear 36 of the planetary gear mechanism 30 is attached to an output shaft 17, which is further linked with the motor M.

The linkage of the motor M with the output shaft 17 is realized by, for example, connecting a rotor with the output shaft 17 while fixing a stator to a casing. This structure enables the rotational force generated by the motor M to be added to the rotational force of the output shaft 17.

The planetary gear unit PG having the above construction has already been proposed by the applicant of the present invention and is disclosed in JAPANESE PATENT LAID-OPEN GAZETTE No. 50-30223. The planetary gear unit PG functions in the following manner, although the above-identified specification should be referred to for details.

In case that both the first clutch 20 and the second clutch 40 are released, the vehicle is in a first mode wherein the driving wheels AH are driven only with the motor M. In case that both the first clutch 20 and the second clutch 40 are connected, the vehicle is in a second mode wherein the driving force of the internal combustion engine EG is all transmitted to the side of the motor M and the driving wheels AH via the planetary gear mechanism 30. In case that the first clutch 20 is connected and the second clutch 40 is released, the vehicle is in a third mode wherein the driving force of the internal combustion engine EG is distributed by the planetary gear mechanism 30 and transmitted to the side of the generator G and the side of the motor M and the driving wheels AH.

Referring back to FIG. 6, the electric power generated by the generator G, which is driven by means of the power of the internal combustion engine EG via the planetary gear unit PG, is used for charging a battery BT. The motor M is driven by means of the electric power supplied from the battery BT. The motor M is, for example, a d.c. brushless motor including a rotor with six-pole permanent magnets and a stator with three-phase windings. The generator G has a similar structure to that of the motor M. A variety of secondary cells, such as lead acid storage batteries, nickel-cadmium batteries, sodium-sulfur batteries, lithium secondary cells, hydrogen secondary cells, and redox cells, fuel cells, and capacitors with large capacity and applicable for a battery BT.

In the hybrid vehicle of the third embodiment, a mode selection control is carried out based on a two-dimensional map of vehicle speed and accelerator position prepared in advance, selecting one among a motor mode wherein the vehicle is driven only by the motor M, an internal combustion engine mode wherein the vehicle is driven only by the internal combustion engine EG, and a combination mode wherein the vehicle is driven by both the motor M and the internal combustion engine EG.

The internal combustion engine EG is similar to the internal combustion engine in the first embodiment, which includes peripheral elements, such as sensors and an actuator, shown in FIG. 1.

Figure 8:
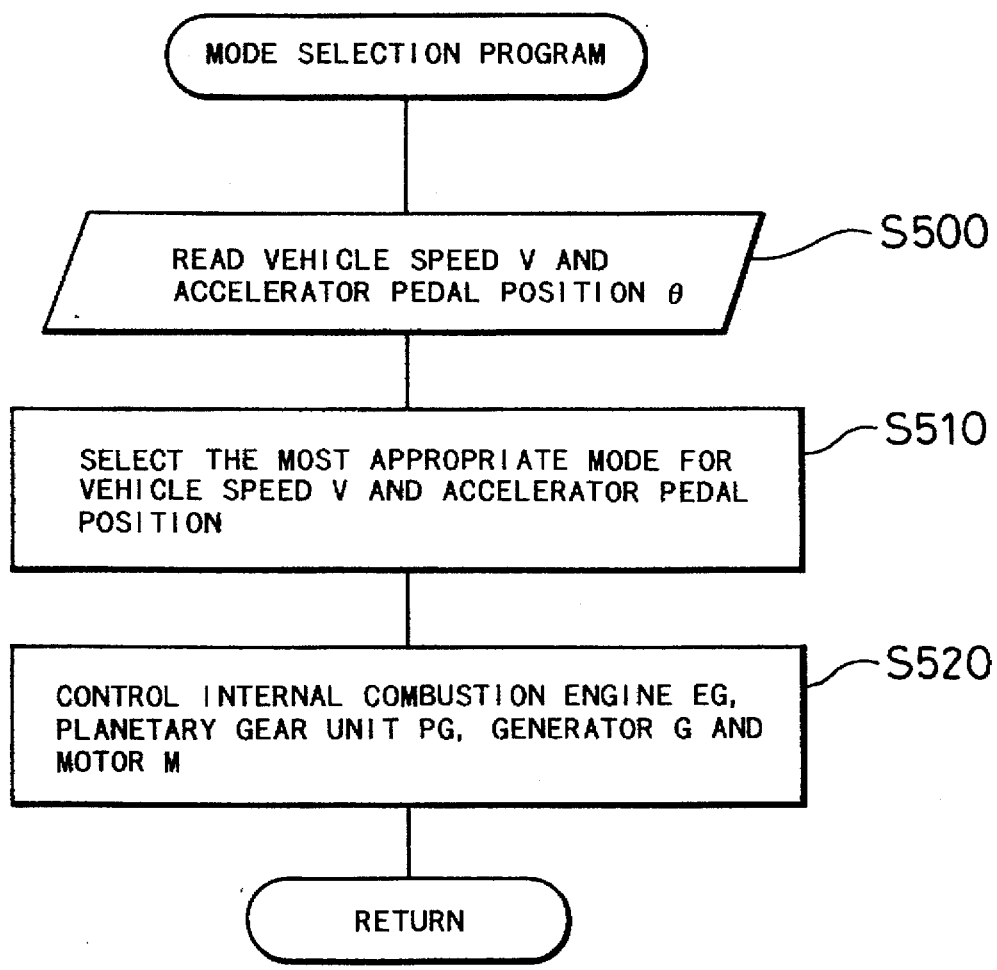
FIG. 8 is a flowchart showing a mode selection routine executed by the CPU in the electronic control unit.
Figure 9:
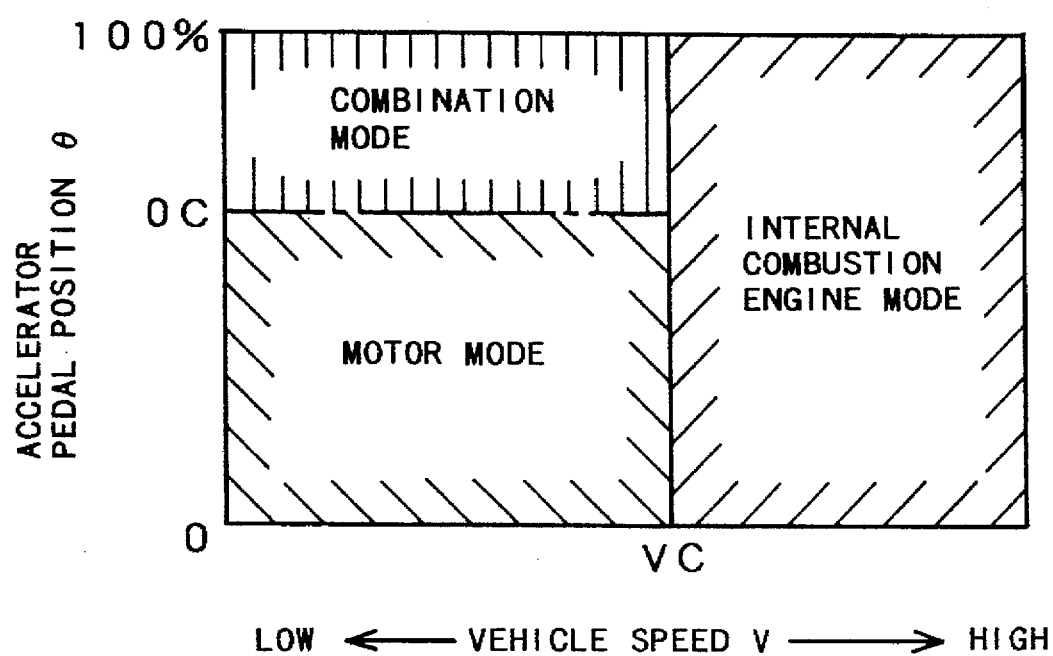
FIG. 9 shows the contents of the mode selection table based on the vehicle speed and the accelerator pedal position.

FIG. 8 is a flowchart showing a mode selection routine executed by the CPU 91 in the ECU 90. The mode selection routine is carried out repetitively at prescribed intervals. As FIG. 8 shows, when the programmers the routine, the ECU 90 reads a vehicle speed V detected by the vehicle speed sensor 87 and an accelerator pedal position θ detected by an accelerator sensor which is not shown in the figure at step S500. The vehicle speed V and the accelerator pedal position p plotted in the two-dimensional map prepared in advance as in FIG. 9 and the most appropriate mode for the vehicle speed V and the accelerator pedal position θ is selected at step S510. The constituents, namely the internal combustion engine EG, the planetary gear unit PG, the generator G and the motor M are controlled to realize the selected mode at step S520, and then the program exits the routine.

Figure 10:
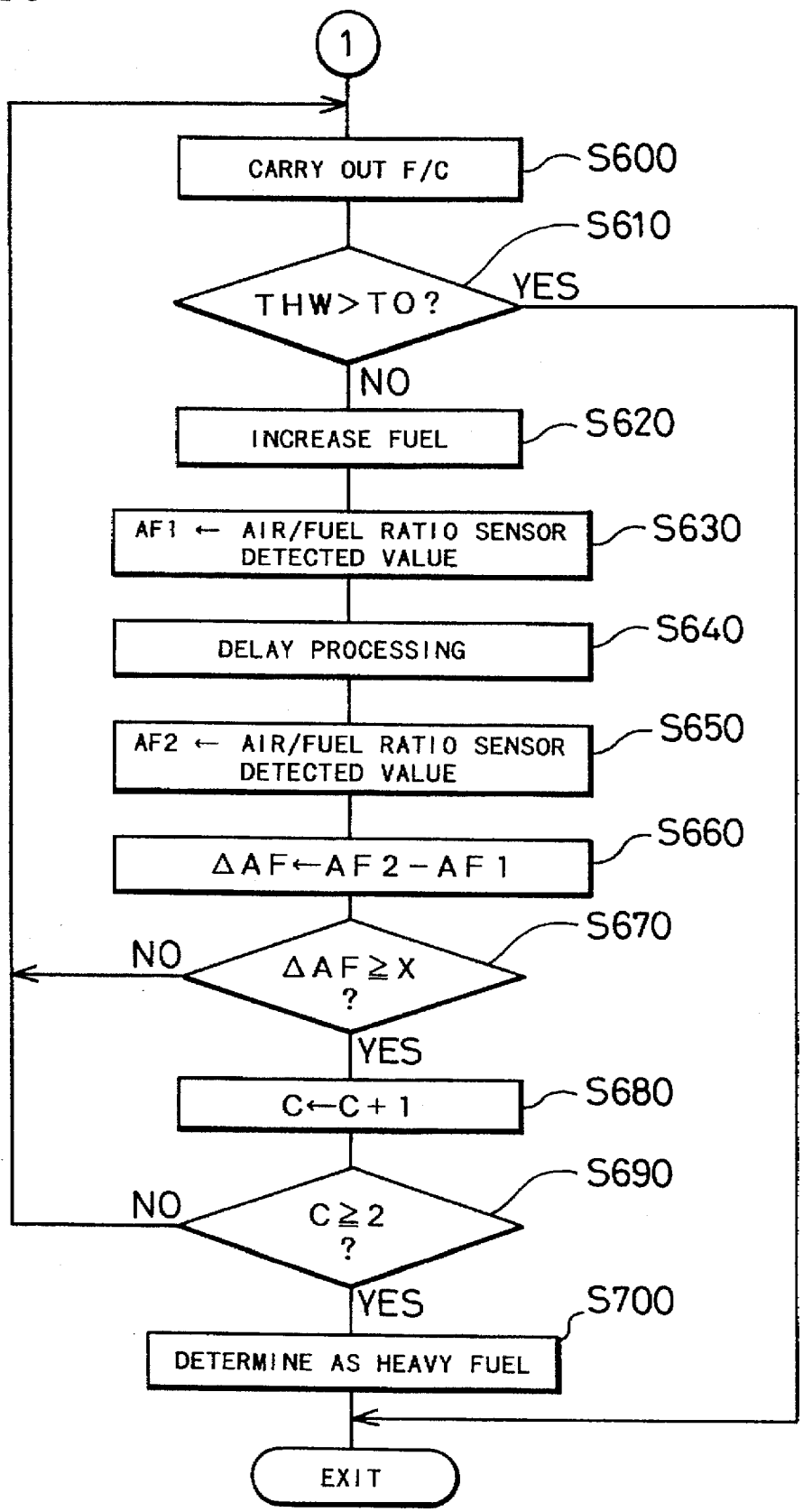
FIG. 10 is a flowchart showing a mode selection routine executed by the CPU in the electronic control unit.

FIG. 10 is a flowchart showing the second half of the internal combustion engine start routine executed by the CPU 91 in the ECU 90. The internal combustion engine start routine is executed on the request of starting the internal combustion engine EG. The first half is the same as shown in FIG. 3 for the first embodiment. The start conditions at step S110 in FIG. 3 include a condition whether or not the vehicle is being driven in the motor mode, besides the conditions mentioned for the first embodiment and, when all of these conditions are fulfilled, the start condition herein are fulfilled.

When the first half of the internal combustion engine start routine as in FIG. 3 is finished, the program proceeds to step S600 in FIG. 10. At step S600, an injection stop signal is transmitted to the injector 64 to carry out the fuel cut-off routine to cut off the fuel supply. Next, it is judged whether or not the cooling water temperature THW detected by the water temperature sensor 84 is higher than the prescribed temperature T0 at step S610. It is judged whether or not the cooling water temperature THW is higher than the prescribed temperature T0 at step S610. If the cooling water temperature THW is judged to be higher than the temperature T0 at this step, the program proceeds to the end and exits the routine since the fuel property detection is prohibited.

If the cooling water temperature THW is judged to be not higher than the temperature T0 at step S610, the following processing is carried out. First, the variable to set the fuel injection amount at the fuel injection control which is carried out in another routine is increased by a prescribed value to make an acceleration state. The prescribed value is equivalent to the increase of fuel at the acceleration in the first embodiment discussed above and sufficient to carry out the following fuel property determination.

After completion of fuel increase indicated at step S620, the processing at steps S630 through S700 is carried out. The steps S630 through S700 are the same as the steps S270 through S340 in the first embodiment. After the processing, the program exits the routine.

In the third embodiment with the structure discussed above, after fuel cut-off is carried out at the time of fuel property detection, the fuel supply is increased and the transition in the combustion state of the internal combustion engine EG is detected indirectly from the transition in the air-fuel ratio of the fuel mixed air in the internal combustion engine EG at that time. Consequently, errors in the fuel property determination are prevented to increase the detection accuracy. Moreover, since this embodiment forcibly carries out the fuel cut-off and the succeeding fuel supply increase, the processing needs not to wait for fuel cut-off and the acceleration, as in the first embodiment, which are carried out according to the operation state of the internal combustion engine EG. Therefore, frequency of the fuel property detection can be increased easily, and thus the detection accuracy can be improved further.

In this embodiment, since the vehicle is driven in the motor mode wherein the axles AX are driven only by the motor M, people on the vehicle will not physically feel any fluctuation in the internal combustion engine load caused by the stop and increase of fuel supply as fluctuation in torque for drive. Accordingly, the fuel properties are detected without incurring the drivability of the vehicle being driven.

Whereas in the first embodiment through the third embodiment, the transition in the combustion state of the internal combustion engine EG is obtained from the transition amount ΔAF of the air-fuel ratio for the prescribed time, a possible alternative structure can obtain the same from the transition speed of the air-fuel ratio, which can have the effect similar to that of the first embodiment through the third embodiment. Another possible alternative structure can obtain the same from the transition speed of the revolution speed, which can have the effect similar to that of those embodiments.

Whereas in the first embodiment through the third embodiment, whether or not heavy fuel is used is determined from the transition amount ΔAF of the air-fuel ratio since the determination of whether or not heavy fuel which has a strong tendency to cause a cold hesitation is used is important, a still another possible alternative structure can compare the transition amount ΔAF of the air-fuel ratio in two stages, first with a first prescribed value X1 which is equal to the prescribed value X mentioned above and next with a second prescribed value X2 which is smaller than the prescribed value X1. This structure enables detection of three different properties, namely heavy fuel, intermediate fuel and light fuel.

Whereas in the first embodiment through the third embodiment, whether or not heavy fuel which is classified so by the volatility is used is determined from the transition amount ΔAF of the air-fuel ratio, a still till another possible alternative structure can detect other fuel properties, such as anti-knock property and stability.

The present invention is not restricted to the above embodiments or applications, but there may be many modifications, changes, and alterations without departing from the scope or spirit of the main characteristics of the present invention.

It should be clearly understood that the above embodiments discussed above are only illustrative and not restrictive in any sense. The scope and spirit of the present invention are limited only by the term of the appended claims.

What is claimed is:

1. An apparatus for detecting properties of fuel supplied to an internal combustion engine, said apparatus comprising:

fuel supply control means for controlling fuel supply to said internal combustion engine;

determination means for determining whether or not said internal combustion engine being operated is in a prescribed state which includes re-start of said fuel supply after said fuel supply has been stopped by said control according to said fuel supply control means;

combustion state transition detection means for detecting transition in combustion state in said internal combustion engine when said internal combustion engine being operated is determined to have reached said prescribed state by said determination means; and fuel property determination means for determining properties of fuel supplied to said internal combustion engine based on said detected transition in combustion state.

2. An apparatus in accordance with claim 1, said fuel supply control means comprising:

fuel supply amount increase means for increasing the amount of said fuel supply beyond the prescribed amount, and said determination means comprising:

means for determining whether or not said fuel supply amount has been increased by said fuel supply amount increase means, thereby determining whether said internal combustion engine being operated has reached said prescribed state.

3. An apparatus in accordance with claim 1, wherein said combustion state transition detection means is an air-fuel ratio sensor for detecting air-fuel ratio of emission from said internal combustion engine, said air-fuel ratio sensor detects said transition in said combustion state.

4. An apparatus in accordance with claim 1, wherein said combustion state transition detection means is a revolution speed sensor for detecting a revolution speed of said internal combustion engine, said revolution speed sensor detects said transition in said combustion state.

5. An apparatus in accordance with claim 1, said apparatus further comprising:

start time detection means for detecting a starting time of said internal combustion engine;

after-start detection means for detecting combustion state transition in said internal combustion engine at a transient time immediately after detection of starting time of said internal combustion engine by said start time detection means;

said fuel property determination means determining properties of the fuel which is supplied to said internal combustion engine, based on the combustion state transition which has been detected by said after-start detection means, as well as said combustion state transition which has been detected by said combustion state transition detection means.

6. An apparatus in accordance with claim 1, said apparatus further comprising:

control means for forcing the fuel supply by said fuel supply means to stop, irrelevant to operation state of said internal combustion engine, at the time of fuel property detection.

7. An apparatus in accordance with claim 6, wherein said internal combustion engine is mounted on a vehicle, said apparatus further comprising:

a motor for generating a turning force sufficient to drive an axles of said vehicle with supplied electric power; and drive adjustment means for driving said axles of said vehicle only with the turning force of said motor during a period which said fuel supply is stopped by said control means.

8. An apparatus in accordance with claim 2, said apparatus further comprising:

control means for forcing fuel supply under the control of said fuel supply control means to stop, irrelevant to operation state of said internal combustion engine at the time of fuel property detection and then forcing increase in fuel supply amount under the control of said amount of said fuel supply increase means to be carried out, irrelevant to operation state of said internal combustion engine.

9. An apparatus in accordance with claim 8, wherein said internal combustion engine is mounted on a vehicle, said apparatus further comprising:

a motor for generating turning force sufficient to drive an axles of said vehicle with supplied electric power; and drive adjustment means for driving the axles of said vehicle only with the turning force of said motor during a period which said fuel supply is stopped and said fuel supply amount is increased by said control means.

10. An apparatus in accordance with claim 1, wherein a property of said fuel is volatility.

11. A method of detecting properties of fuel supplied to an internal combustion engine, said method comprising the steps of:

(a) controlling of fuel supply to said internal combustion engine;

(b) determining whether or not said internal combustion engine being operated is in a prescribed state which comprises a re-start of said fuel supply after a stop of said fuel supply in said step (a);

(c) detecting transition in combustion state of said internal combustion engine in case that said internal combustion engine has been determined to be in said prescribed state in said step (b); and (d) determining properties of fuel supplied to said internal combustion engine, based on said detected transition in said combustion state.

12. A method in accordance with claim 11, wherein said step (a) comprises the step of:

(a-1) increasing the amount of said fuel supply beyond the prescribed amount, said step (c) comprises the step of:

(c-1) determining whether or not said fuel supply amount has been increased at said step (a-1) and thus determining whether or not operation state of said internal combustion engine has become said prescribed state.

13. A method in accordance with claim 11, wherein said step (c) comprises the step of:

(c-2) detecting air-fuel ratio of emission from said internal combustion engine and thus detecting transition in said combustion state.

14. A method in accordance with claim 11, wherein said step (c) comprises the step of:

(c-3) detecting revolution speed of said internal combustion engine and thus detecting transition in said combustion state.

15. A method in accordance with claim 11, said method further comprising the steps of:

(e) detecting a starting time of said internal combustion engine; and (f) detecting combustion state transition in said internal combustion engine at a transient time immediately after detection of starting time of said internal combustion engine at said step (e), wherein said step (d) comprises the step of:

determining properties of the fuel which is supplied to said internal combustion engine, based on the combustion state transition which has been detected at said step (f), as well as said combustion state transition which has been detected at said step (c).

16. A method in accordance with claim 11, said method further comprising the step of:

(g) forcing fuel supply which is in compliance with said step (b) to stop, irrelevant to operation state of said internal combustion engine, at the time of fuel property detection.

17. A method in accordance with claim 16, wherein said internal combustion engine is mounted on a vehicle, said method further comprising the steps of:

(h) generating a turning force sufficient to drive an axles of said vehicle with supplied electric power; and (i) driving said axles of said vehicle only with the turning force of said motor during a period which said fuel supply is stopped at said step (g).

18. A method in accordance with claim 12, said method further comprising the step of:

(j) forcing fuel supply which is in compliance with said step (b) to stop, irrelevant to operation state of said internal combustion engine at the time of fuel property detection and then forcing increase in fuel supply amount which is in compliance with said step (a-1) to be carried out, irrelevant to operation state of said internal combustion engine.

19. A method in accordance with claim 18, wherein said internal combustion engine is mounted on a vehicle, said method further comprising the steps of:

(k) generating turning force sufficient to drive axles of said vehicle with supplied electric power; and (l) driving the axles of said vehicle only with the turning force of said motor during period which said steps (b) and (a-1) are carried out in compliance with said step (j).

20. A method in accordance with claim 11, wherein a property of said fuel is volatility.

* * * * *

UNITED STATES PATENT AND TRADEMARK OFFICE
CERTIFICATE OF CORRECTION

PATENT NO. : 5,732,681
DATED : 31 March 1998
INVENTOR(S) : Tamotsu OGITA

It is certified that error appears in the above-identified patent and that said Letters Patent is hereby corrected as shown below:

| Column | Line | |
|---|---|---|
| 1 | 21 | Change "jet out" to --ejected out--. |
| 2 | 24 | Change "reflects" to --reflect--. |
| 2 | 45 | Change "detects" to --detecting--. |
| 2 | 47 | Change "one" to --another--. |
| 2 | 50 | Change "detects" to --detecting--. |
| 2 | 52 | Change "one" to --another--. |
| 3 | 29-30 | Change "incurring" to --affecting--. |
| 3 | 49 | Change "an axles" to --the axles--. |
| 3 | 53 | After "period" insert --in--. |
| 5 | 24 | Change "bypasses" to --bypass--. |
| 7 | 66 | Change "wait" to --waits--. |

UNITED STATES PATENT AND TRADEMARK OFFICE
CERTIFICATE OF CORRECTION

PATENT NO. : 5,732,681

DATED : 31 March 1998

INVENTOR(S) : Tamotsu OGITA

It is certified that error appears in the above-identified patent and that said Letters Patent is hereby corrected as shown below:

| Column | Line | |
|---|---|---|
| 8 | 9 | After "as" delete "of a". |
| 9 | 21 | Change "while" to --and--. |
| 9 | 32 | Change "t the next" to --to the next--. |
| 11 | 64 | Change "programmers" to --program enters--. |
| 12 | 18 | Change "condition" to --conditions--. |
| 13 | 31 | Change "a still till another" to --still another--. |
| 14 | 44 | Change "an axles" to --the axles--. |
| 14 | 58 | Delete "amount of said". |
| 14 | 64 | Change "drive an" to --drive the--. |
| 16 | 20 | Change "an axles" to --the axles--. |

Signed and Sealed this

Fifteenth Day of December, 1998

Attest:

BRUCE LEHMAN

Attesting Officer

Commissioner of Patents and Trademarks